United States Patent [19]

Wilkinson

[11] Patent Number: 4,458,811
[45] Date of Patent: Jul. 10, 1984

[54] COMPARTMENTED FLEXIBLE SOLUTION CONTAINER

[75] Inventor: Kenneth E. Wilkinson, Round Lake, Ill.

[73] Assignee: Abbott Laboratories, North Chicago, Ill.

[21] Appl. No.: 487,432

[22] Filed: Apr. 21, 1983

[51] Int. Cl.³ ..................... B65D 85/32; B65D 25/08; B65D 27/08
[52] U.S. Cl. .................................. 206/219; 206/221; 383/38; 383/80
[58] Field of Search ....................... 206/219, 221, 222; 383/80, 38, 96

[56] References Cited

U.S. PATENT DOCUMENTS

| | | | |
|---|---|---|---|
| 3,156,352 | 11/1964 | Hayhurst | 206/219 |
| 3,175,558 | 3/1965 | Caillouette et al. | 128/403 |
| 3,294,227 | 12/1966 | Schneider et al. | 206/219 |
| 3,429,429 | 2/1969 | Poitras | 206/222 |
| 3,462,070 | 8/1969 | Corella | 206/221 |
| 3,608,709 | 9/1971 | Pike | 206/219 |
| 3,744,625 | 7/1973 | Chin | 206/219 |
| 3,950,158 | 4/1976 | Gossett | 206/219 |
| 3,964,604 | 6/1976 | Prenntzell | 206/219 |
| 3,983,994 | 10/1976 | Wyslotsky | 206/219 |
| 4,312,473 | 1/1982 | Hoeller | 206/219 |

FOREIGN PATENT DOCUMENTS 2111701 3/1971 Fed. Rep. of Germany ........ 383/38

Primary Examiner—Joseph Man-Fu Moy
Assistant Examiner—Brenda J. Ehrhardt
Attorney, Agent, or Firm—Neil E. Hamilton; Alan R. Thiele

[57] ABSTRACT

A compartmented and collapsible container for sterile components which has at least one separate compartment for each component, yet will permit the intermixing of the components upon the breaking of a frangible member which separates the compartments. The compartmented container is specifically constructed for use with two solutions which are normally incompatible when mixed. The container herein described permits the two incompatible solutions to be sterilized in a disposable, flexible container. At the time of usage, the two materials can be readily intermixed in the same container and administered therefrom, such as with the usual intravenous administration equipment. An important feature of the container is a frangible member which is sealed to the container in a unique manner between the compartments, yet is readily fractured to permit the free flow of materials between the compartments.

25 Claims, 21 Drawing Figures

COMPARTMENTED FLEXIBLE SOLUTION CONTAINER

BACKGROUND OF THE INVENTION

This invention relates to a flexible container for materials which are normally incompatible when stored. More particularly, the invention relates to a compartmented container wherein two incompatible materials can be sterilized in the flexible container and can subsequently be readily intermixed and administered in a safe and convenient manner.

Compartmented containers for different types of materials are well known in the art. For example, in U.S. Pat. No. 3,608,709 a laminated package is provided with an intermediate seal which includes a release area to allow the two materials to intermix. In U.S. Pat. No. 3,294,227 a folded strip barrier is disclosed for a similar purpose. U.S. Pat. Nos. 3,156,352; 3,175,558; 3,744,625; and 3,983,994 illustrate internal type seals in a multi-compartment package. In U.S. Pat. Nos. 3,950,158 and 3,964,604 rupturable type barriers are indicated for compartmented containers.

In the field of intravenous therapy, such as nutritionals, it is common practice to combine at least two aqueous based solutions such as dextrose and amino acids, and deliver them to the patient in one common infusion. Due to chemical reactivity in the autoclave sterilization process or to degradation of the components over extended durations of time when mixed together, it has been necessary for the manufacturer to package the components separately. Historically, combination of the components occurs near time of use at a central hospital pharmacy. This can be a potentially hazardous procedure based on the technique used if the components of the container are exposed even briefly to the outside atmosphere. The procedure of combining the components at the hospital pharmacy require special facilities, highly trained and conscientious personnel, valuable time, and hence an added burden of cost of the hospital especially in the situation where the hospital procures at least one of the components in bulk form and batch processes a multiple number of containers at once.

The prior art does not provide a multi-compartment container for an intravenous solution which can be readily sterilized yet activated in a desired manner. This is due to the fact that there are inherent deficiencies in the prior art containers that either prevent them from being produced economically, fail to consist and function as desired or neglect to meet all end-user requirements.

It is an advantage of the present invention to provide a package separated into two compartments containing two components that would be intermixed at the time of use by means of rupturing an internal frangible member to allow the separated components to completely intermix with each other. Other advantages are a flexible intravenous solution container containing parenteral intravenous products to be intermixed and subsequently administered; a multi-compartment container wherein the means of rupturing a frangible member separating the two compartments can be consistent and controlled; a multi-compartment container that is simple in design and able to be mass produced using existing technology, commonly used fabrication equipment and applicable to a wide range of materials; a container which provides a method of intermixing at least two I.V. solutions, so that when they are combined, maintenance of sterility is assured; and a method of combining two separated components for an admixture solution that is not time consuming, does not require special facilities, or highly trained personnel to activate.

SUMMARY OF THE INVENTION

The foregoing advantages are accomplished and the shortcomings of the prior art art overcome by the compartmented flexible container for at least two different fluids wherein the fluids can be intermixed inside the container through breaking of a frangible member in the container. Two spaced apart opposing walls formed from a plastic resinous material provide a body section with internal wall surfaces. A substantially flat and singular planar frangible member is positioned inside the body section in a manner to separate the inside of the body section into two separate compartments. The frangible member has first and second longitudinally extending attachment members with a weakened portion extending longitudinally therebetween. Each of the first and second attachment members have two surface portions with one of the surface portions facing in one direction and the other in the opposing direction. The first attachment member is secured to one wall by means of one of the surface portions facing in the one direction and the second attachment member is secured to the opposing wall by means of the other of the surface portions facing in the opposing direction. The frangible member is secured in such a manner that the surface portion of the first attachment member facing in the opposing direction and the surface portion of the second attachment member facing in the one direction are unattached. Upon a bending of the body section of the container along the line parallel and adjacent to the weakened portion, the weakened portion will fracture and the contents of the compartments can be readily intermixed.

In a preferred manner, the container bodies are fabricated from two separate sheets of thermoplastic material which are seated at the periphery. The frangible member is formed as a separate component and sealed inside the container with the sealing of the sheets of thermoplastic material. The surface portions and the weakened portion of the frangible member can be of various geometric configurations. For example, the surface contact portions can be substantially flat or rounded in configuration, whereas the weakened portions can be difined by opposing, substantially U-shaped or V-shaped channels. The depth of the channels also can vary in that they can be approximately one-half the thickness of the frangible member or alternatively can be less than this thickness. The container body section can be fabricated from a single sheet of thermoplastic material and sealed along three sides thereof. The frangible member can be utilized in containers of various configurations and can be placed either longitudinally or transversely with respect thereto. All of the various frangible members and container configurations will include the usual bag ports which will permit filling as well as administration of the later mixed portions.

BRIEF DESCRIPTION OF THE DRAWINGS

A better understanding of the compartmented flexible container of this invention will be had by reference to the following description together with the accompanying drawings, wherein.

DESCRIPTION OF THE EMBODIMENTS

Figure 1:
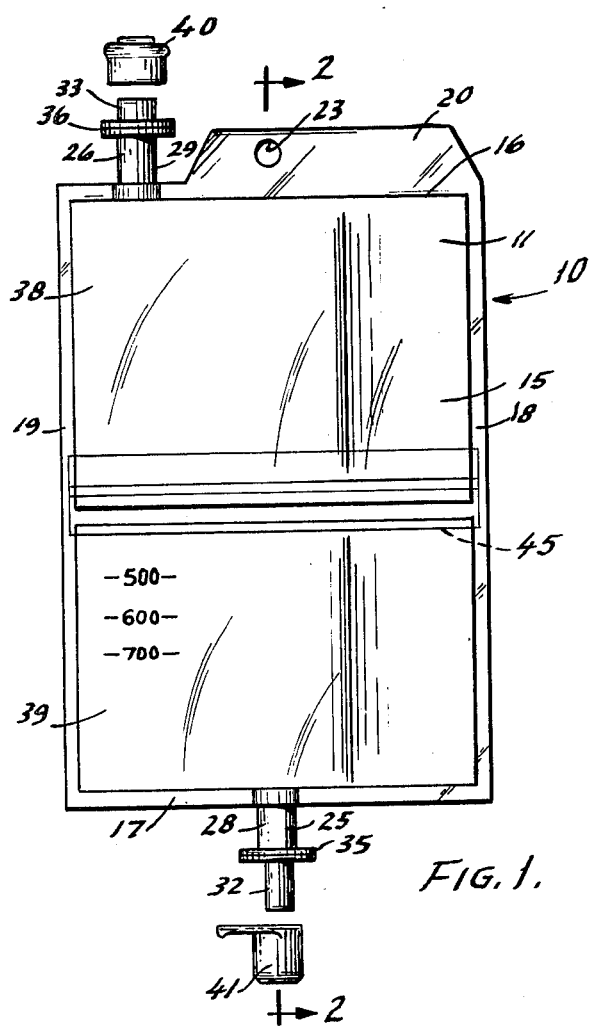
FIG. 1 is a view in side elevation showing the container of this invention with the frangible member therein and having opposing ports.

Referrring to FIG. 1 of the drawing, the flexible compartmented container generally 10 includes a tubular body section 11 having a front wall 15 which at one end terminates in an end wall 17 and another end wall 16 at the opposing end. Extending from end wall 16 is hanger section 20 having an aperture 23 for engagement with a usual supporting hook (not shown). Extending through opposing end walls 16 and 17 are tubular ports 25 and 26. Tubular port 26 includes an inner tubular member 29 and an outer tubular member 33 with an intermediate flange 36. A reseal cap 40 is provided to seal the end of outer tubular member 33. Similarly, tubular port 25 has inner and outer tubular members 28 and 32 respectively with an intermediate flange 35. In the instance of port 25 a protective cap 41 is provided for sealing the end of outer tubular member 32.

Figure 2:
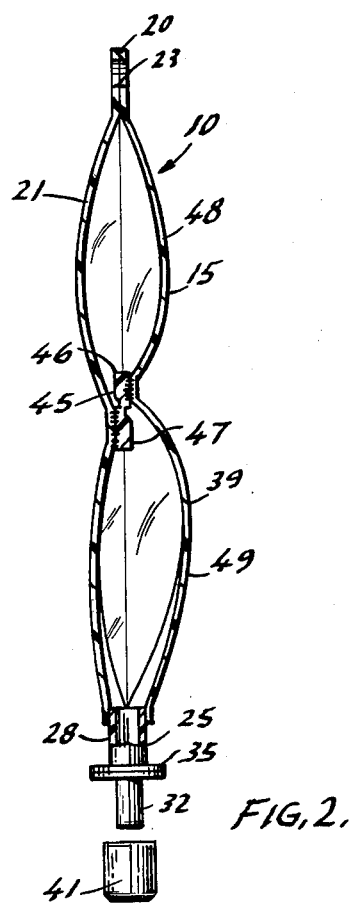
FIG. 2 is a view in partial vertical section illustrating the container of FIG. 1.
Figure 3:
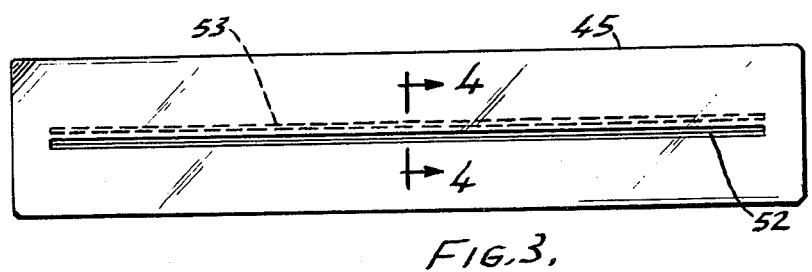
FIG. 3 is a top plan view showing the frangible member employed in the container illustrated in FIG. 1.
Figure 4:
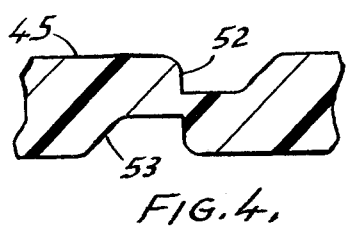
FIG. 4 is a view in vertical section taken along line 4—4 of FIG. 3.

Extending transversely and centrally across compartmented container 10 is a frangible member 45. The frangible member is best illustrated in FIGS. 2, 3 and 4. Referring to FIGS. 3 and 4, it will be noted that frangible member 45 has a generally rectangular and flat configuration with opposing and overlapping channels 52 and 53. Referring specifically to FIG. 2, it will be seen that opposing sides of the frangible member are sealed to opposing sides of container 10. For example, portion 46 is sealed at one side to front-wall 15 and portion 47 is sealed to back-wall 21. The opposing sides of portions 46 and 45 are left unsealed.

Figure 5:
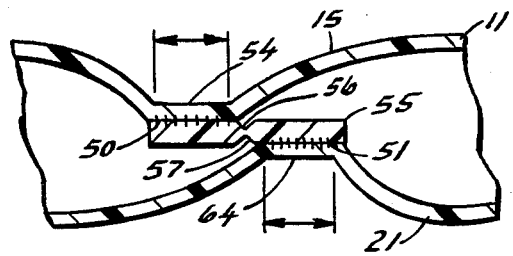
FIG. 5 is a partial, enlarged view in vertical section illustrating a frangible member in the container of FIG. 1.
Figure 6:
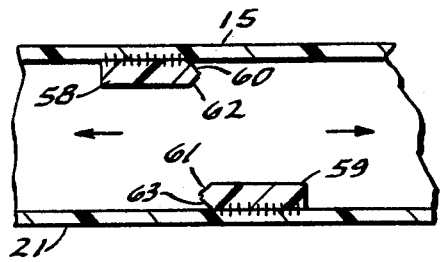
FIG. 6 is a view similar to FIG. 5 except showing the frangible member after it is broken.
Figure 7:
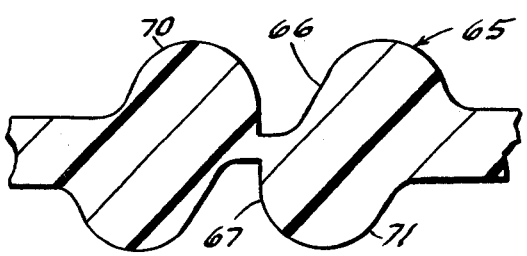
FIGS. 7–9f illustrate various geometric configurations in vertical section for the frangible member employed in the container of this invention.

FIGS. 5 and 6 illustrate an alternative embodiment of a frangible member 55 with opposing V-shaped channels 56 and 57 separating flat surface portions 50 and 51 for joining with flat portions 54 and 64 of container body section 11. As is true in all of the embodiments herein, the opposing sides of the frangible member 55 are sealed to the front-wall 15 and the back-wall 21 of tubular body section 11 with the opposing sides unsealed. In FIG. 6 a tearing of the frangible member is indicated which will be further described in the operation.

Figure 8:
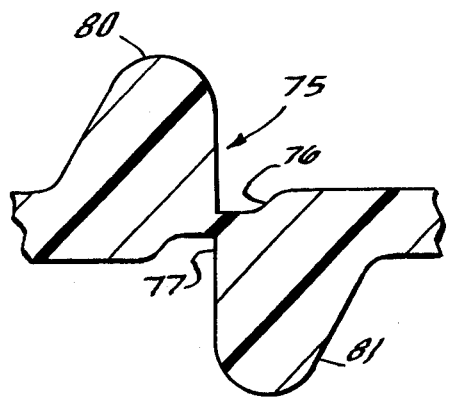
Figure 9A:
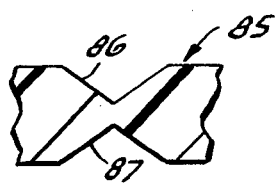
Figure 9B:
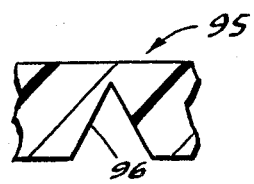
Figure 9C:
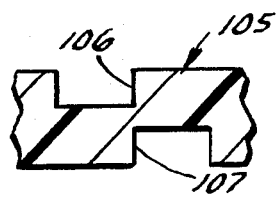
Figure 9D:
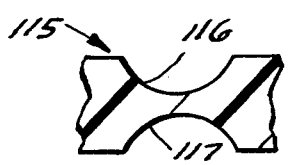
Figure 9E:
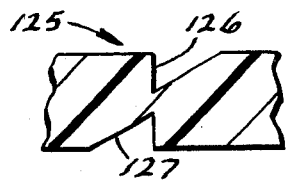
Figure 9F:
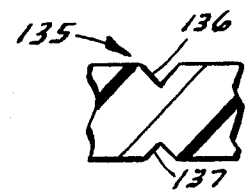

FIGS. 7–9f illustrate various geometric configurations for frangible members generally 65, 75, 85, 95, 105, 115, 125 and 135. Frangible member 65 illustrates two rounded portions 70 and 71 for sealing with the front and rear walls 15 and 21 of container body section 11 with overlapping substantially U-shaped channels 66 and 67. In FIG. 8, frangible member generally 75 is constructed with projecting members 80 and 81 with overlapping channels 76 and 77. Projecting members 80 and 81 are of an eliptical configuration and provide the surface portions for sealing inside container walls 15 and 21. In this embodiment, one leg of the U-shaped channel member is longer than the other. Opposing V-shaped channels are illustrated in FIG. 9A for frangible member generally 85 with the V-shaped channel being of a rather wide angle of 45 degrees. In this embodiment, the V-shaped channels have the apexes of the "V" positioned adjacent each other and the channels are mirror images and together extend more than one-half the thickness of member 85. In FIG. 9B, embodiment generally 95 has only a singular V-shaped channel 96 of a relatively acute angle of 60 degrees. Rectangular shaped channels which are offset are shown at 106 and 107 in the frangible member generally 105 of FIG. 9C with only lateral portions in alignment. In FIG. 9D, rounded, opposing and mirror imaged channels 116 and 117 are shown for frangible member generally 115, whereas in FIG. 9E offset V-shaped channel members 126 and 127 are illustrated having an acute angle of 30 degrees for frangible member generally 125. In this instance one leg of the "V" is shorter than the other. In FIG. 9F, opposing V-shaped channels 136 and 137 are described which are of a slight depth in relation to the width of the body of the frangible member generally 135 together extending less than one-half the thickness of the frangible member.

Figure 10:
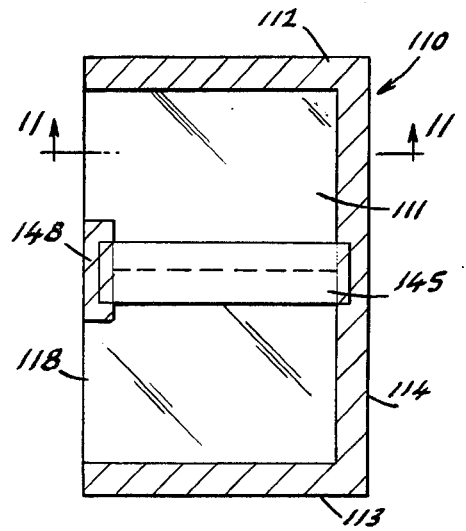
FIG. 10 is an alternative embodiment illustrating the frangible member sealed in a container which in turn is sealed along three sides thereof.

FIG. 10 illustrates a frangible member 145 which could be of any other previously referred to geometric configurations. In container generally 110 the container body section 111 is formed from a single sheet of plastic material which is sealed at opposing ends and along one side thereof to provide sealed end walls 112 and 113 and sealed side wall 114. Frangible member 145 is sealed transversely across container body section 111 so that it is bonded to side-wall 114 as well as 118 in side seal 148.

Figure 12:
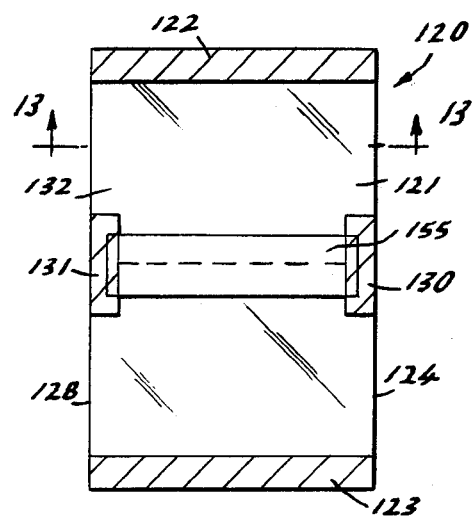
FIG. 12 is a view in partial vertical section illustrating the frangible member in a tubular type container.
Figure 11:
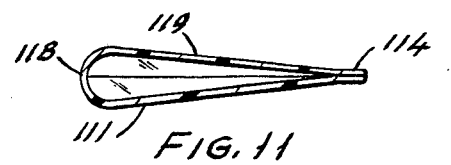
FIG. 11 is a view in vertical section taken along line 11—11 of FIG. 10.
Figure 13:
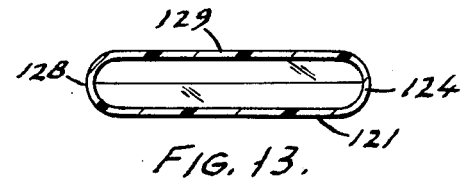
FIG. 13 is a view in vertical section taken along line 13—13 of FIG. 12.

FIG. 12 represents frangible member 155 in container generally 120 wherein the container body section 132 is formed from a tubular piece of plastic material which is sealed at end walls 122 and 123. Frangible member 155 is sealed transversely and midway between front wall 121 and back wall 129 by means of seals 130 and 131 in side walls 124 and 128. While no tubular ports are indicated with respect to compartmented containers 110 and 120, one or more of such ports will be utilized and sealed through the end walls which can be done in any desired manner.

Figure 14:
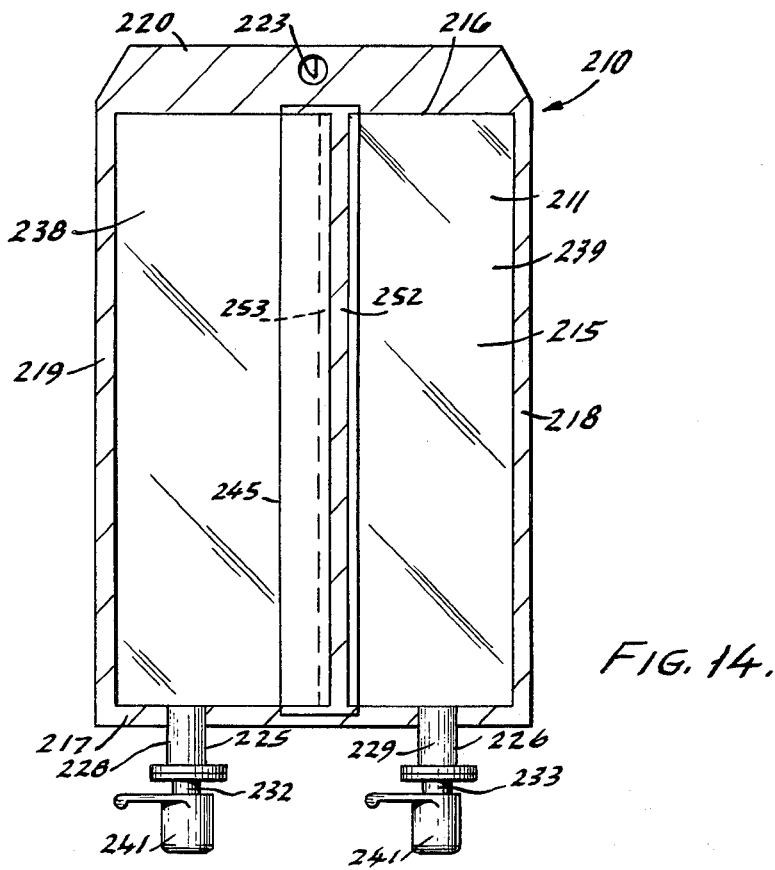
FIG. 14 is a view in vertical section and in elevation of a container illustrating the frangible member positioned parallel to the longitudinal axis thereof.

In FIG. 14 another alternative embodiment of compartmented container generally 210 is disclosed. Similar parts are referenced with similar numbers as were employed in describing compartmented container 10 except that the numbers are in the "200" series. It will be noted that the major difference between containers 10 and 210 is that the frangible member 245 is shown disposed in a parallel position with respect to the longitudinal axis of the container and body section 211. With frangible member 245 sealed in body section 211 in the manner described, two rectangular compartments 238 and 239 will result which will be in communication with ports 225 and 226. This is in contrast to the more square compartments 138 and 139 in compartmented container 10.

Fabrication

Figure 15:
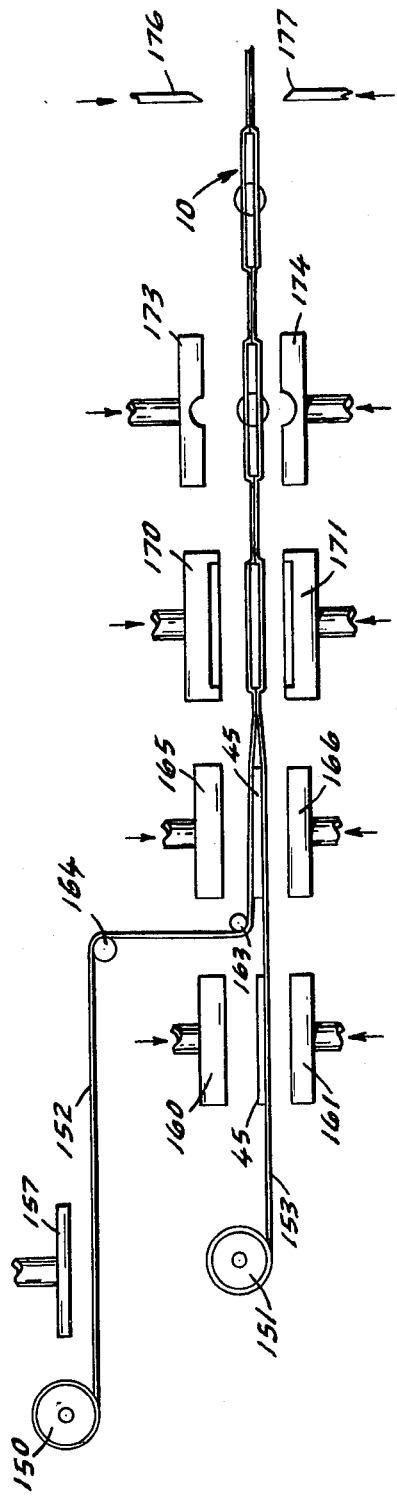
FIGS. 15 and 16 are diagrammatic views illustrating the fabrication method for the compartmented container of this invention with FIG. 16 being a top plan view of substantially all of FIG. 15.
Figure 16:
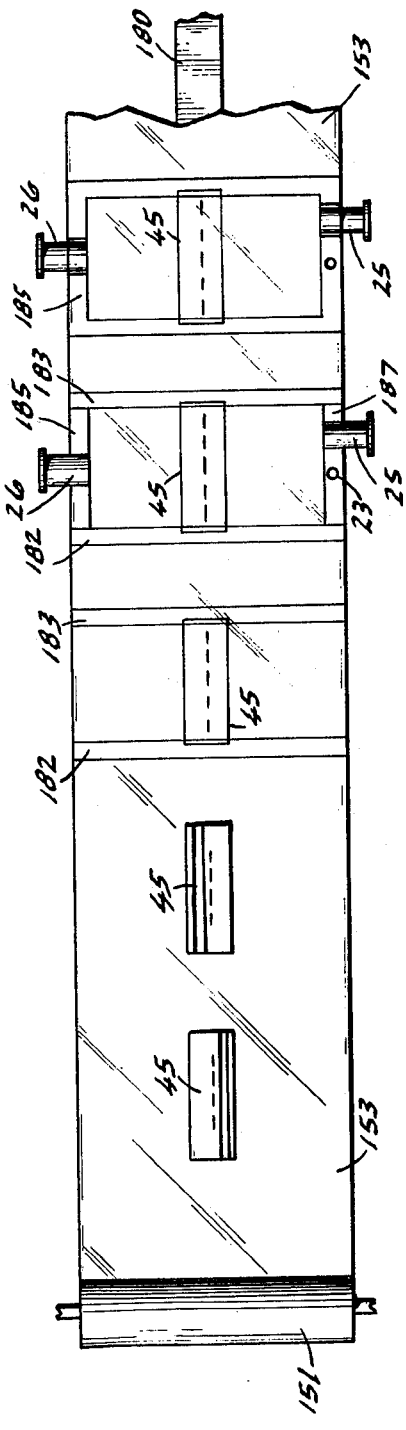

FIGS. 15 and 16 illustrate a method of fabricating the compartmented containers of this invention. Two sheets of plastic material 152 and 153 will be conveyed in a substantially parallel manner from two supply rolls 150 and 151. A printing apparatus, such as indicated at 157, will print the necessary labeling information at the desired position on one of the plastic sheets which will preferably form the front panel of the container. Two sealing dies 160 and 161 will seal the frangible seal element such as represented by the numeral 45 to plastic sheet 153. Plastic sheet 152 will be guided by mean of the guide roll 164 and 163 to an adjacent parallel position between seal dies 165 and 166 while the opposing side of the frangible member 145 will be sealed to sheet 152. Bag sealing dies are represented at 170 and 171 where the side walls and end walls of the container will be formed. Port sealing dies 173 and 174 will secure the ports such as 25 and 26 to the inside of the container body formed by seal dies 170 and 171. Compartmented container generally 10 will result from the previously described process except for the trimming operation which will sever the container from the sealed sheet material by the usual bag trimmers 176 and 177. Reference numeral 180 in FIG. 16 represents the usual conveyor system which will guide the sheet material 153 during the various stages of printing and sealing as previously described.

Operation

The filling and use of the compartmented container of this invention is substantially the same for all of the embodiments, Accordingly, only those particular features with respect to compartmented container 10 will be described except where they are different in the other embodiments. Compartments 38 and 39 will be filled with the desired material through the open ports afforded by ports 25 and 26. This material for example could be dextrose solution to be placed in compartment 38 and a nutritional material such as an amino acid solution or I.V. fat emulsion in compartment 39. These filled compartments are then sealed to outside atmosphere by means of resealed cap 40 on port 26 and a protective cap 41 on port 25. The filled container will then be sterilized such as by autoclave sterilization and then provided with an overwrap to environmentally protect from any external foreign contaminants, moisture loss, gas permeation, etc. If desired, the overwrapping and sterilization could be effected at the same time. Further, depending on the sterilization cycle of each material, if the cycles are different, one compartment can be filled and sterilized and then the other compartment filled and sterilized. The container of this invention readily lends itself to this procedure.

When it is desired to utilize the filled container 10, the overwrap will be removed and in the instance where compartment 38 contains a powdered material such as an antibiotic, sterile liquid can be introduced such as by means of a hypodermic syringe through reseal cap 40. After filling with the desired amount of liquid intermixing of the liquid in the antibiotic can be effected by shaking the container. When it is desired to intermix the reconstituted antibiotic in compartment 38 with the nutritional material in 39, all that is required is to effect a squeezing action or any similar force onto the container walls which will thereby cause a breaking across the opposing channel members such as 52 and 53. This breaking action then will sever the frangible member as indicated in FIG. 6 to allow free flow in mixing of the two fluid materials in container 10. After thorough intermixing, the container can be supported from the usual hook such as by placing on aperture 23 and the protective cap 41 removed from administration port 25. The usual administration pin and set will then be applied to port 25 and the mixed materials administered in the usual manner. In FIGS. 7-9F various configurations for the frangible member and their channels are indicated. All of them are designed for the purpose of effecting a tearing action in severing the frangible member such as indicated in FIG. 6 for frangible member 55.

The preferred plastic resin for the plastic sheet material forming the various compartmented containers 10, 110, 120 and 210 is a polyolefin. Other thermoplastic resinous materials such as polyvinyl chloride or polyester could be employed depending upon the types of materials to be placed in the containers and the sterilization thereof. The preferred resinous plastic for forming the various tubular ports such as 25 and 26 is also a polyolefin. However, other plastic tubing could be utilized depending upon the sealing requirements and the compatability with the sheet plastic forming the various body sections of the containers.

While the various containers have been described for use with an intravenous nutritional product, other applications for the container are numerous in the related medical field such as enteral feeding, continuous ambulatory peritoneal dialysis, chemotherapy, etc. Further, the compartmented container of this invention fulfills the need for a container in industries apart from the medical field such as food and beverage, cosmetics, adhesives, etc. Further, while the containers of this invention have been described for use with a single frangible member to form a dual compartment container, it is obvious that several of the frangible members could be sealed in a container to form a multiplicity of compartments, the contents of which can be intermixed by breaking the various frangible members in any preferred sequence.

It will thus be seen that through the present invention there is now provided a flexible container for any compatible materials which is easily fabricated and readily utilized to mix the compartmented materials. The container with the frangible member can be activated with a minimum amount of effort yet provide a container system which will not be activated unintentionally. The container of this invention can be molded in various configurations to be adapted to numerous types of incompatible materials. The materials when placed in the various compartments of the container are readily sterilized and will remain sterile until the desired intermixing. All of the foregoing is accomplished in the container which can be fabricated in the manner which does not result in increased cost and accordingly, in a container system which is disposable.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

What is claimed is:

1. A compartmented flexible container for at least two different fluids wherein said fluids can be intermixed inside said container through breaking of a frangible member in said container comprising:
   a body section defined by spaced apart opposing walls formed from a plastic resinous material and having internal wall surfaces;
   a substantially flat and singular planar frangible member positioned inside said body section in a manner to separate the inside of said body section into two separate compartments, said frangible member defined by first and second longitudinally extending attachment members with a weakened portion extending longitudinally therebetween; each said first and second attachment members having at least two surface portions with one of said surface portions facing in one direction and the other in an opposing direction;
   said first attachment member secured to said one internal wall surface by means of one of said surface portions facing in said one direction and said second attachment member secured to said opposing internal wall surface by means of one of said surface portions facing the opposing direction, with the surface portion of said first attachment member facing said opposing direction and the surface portion of said second attachment member facing said one direction being unattached;
   whereby upon bending of said body section of said container along a line parallel and adjacent to said weakened portion, said weakened portion will fracture and the contents of said compartments can be intermixed.

2. The compartmented flexible container as defined in claim 1 wherein said container body section is fabricated from two separate sheets of thermoplastic material which are sealed at the periphery.

3. The compartmented flexible container as defined in claim 2 wherein said frangible member is formed as a separate component and sealed inside said container with said sealing of said sheets of thermoplastic material.

4. The compartmented flexible container as defined in claim 1 wherein said surface portions of said attachment members are substantially flat in configuration.

5. The compartmented flexible container as defined in claim 1 wherein said surface portions of said attachment members are substantially rounded in configuration.

6. The compartmented flexible container as defined in claim 4 wherein said weakened portion is defined by opposing substantially U-shaped channels, with portions of said channels overlapping.

7. The compartmented flexible container as defined in claim 5 wherein said weakened portion is defined by opposing substantially U-shaped channels with portions of said channels overlapping.

8. The compartmented flexible container as defined in claim 5 wherein said surface portions of said attachment members are partially elliptical in configuration.

9. The compartmented flexible container as defined in claim 4 wherein said weakened portion is defined by opposing substantially V-shaped channels with the apexes of said V-shaped channels positioned adjacent each other and said channels being positioned as mirror images.

10. The compartmented flexible container as defined in claim 4 wherein said weakened portion is defined by a single V-shaped channel.

11. The compartmented flexible container as defined in claim 4 wherein said weakened portion is defined by two oppositely positioned, substantially U-shaped channel members with said channels being offset from each other in such a manner that only the lateral portions are in alignment.

12. The compartmented flexible container as defined in claim 11 wherein portions of said U-shaped channels are rounded and one leg is longer than the other.

13. The compartmented flexible container as defined in claim 4 wherein said weakened portion is defined by opposing substantially arcuate channels with the deepest portions of said channels being positioned adjacent each other and said channels being positioned as mirror images.

14. The compartmented flexible container as defined in claim 4 wherein said weakened portion is defined by two oppositely positioned, substantially V-shaped channel members with said channels being offset from each other and with one leg of said V-shaped channel being shorter than the other and the shorter legs being the only aligned portions.

15. The compartmented flexible container as defined in claim 9 wherein said channels extend more than one-half of the thickness of said frangible member.

16. The compartmented flexible container as defined in claim 9 wherein said channels extend less than one-half of the thickness of said frangible member.

17. The compartmented flexible container as defined in claim 1 wherein said container body section is fabricated from a single sheet of thermoplastic material which is sealed along three sides thereof.

18. The compartmented flexible container as defined in claim 1 wherein said container body section is fabricated from a tubular portion of thermoplastic material which is sealed at the opposing ends.

19. The compartmented flexible container as defined in claim 1 wherein said body section is of a rectangular configuration with a longitudinal axis longer than a transverse axis and said frangible member is positioned transversely with respect to the longitudinal axis.

20. The compartmented flexible container as defined in claim 1 wherein said body section is of a rectangular configuration with a longitudinal axis longer than a transverse axis and said frangible member is positioned parallel with respect to the longitudinal axis.

21. The compartmented flexible container as defined in claim 1 further including a tubular port member in fluid communication with each compartment.

22. A compartmented flexible I.V. container for at least two different and incompatible I.V. fluids wherein said fluids can be intermixed inside said container through breaking of a frangible member in said container comprising:
   a body section defined by spaced apart opposing walls formed from a plastic resinous material and having internal wall surfaces;
   a substantially flat and singular planar frangible member positioned inside said body section in a manner to separate the inside of said body section into two separate compartments, said frangible member defined by first and second longitudinally extending attachment members with a weakened portion extending longitudinally therebetween; each said first and second attachment members having at least two surface portions with one of said surface portions facing in one direction and the other in an opposing direction;

said first attachment member secured to said one internal wall surface by means of one of said surface portions facing in said one direction and said second attachment member secured to said opposing internal wall surface by means of one of said surface portions facing the opposing direction, with the surface portion of said first attachment member facing said opposing direction and the surface portion of said second attachment member facing said one direction being unattached;

an I.V. fluid material in one of said compartments;

a different and incompatible I.V. fluid material in the other of said compartments;

whereby upon bending of said body section of said container along a line parallel and adjacent to said weakened portion, said weakened portion will fracture and the I.V. fluid materials will flow together and can be intermixed.

23. A compartmented flexible I.V. container for at least two different and incompatible I.V. fluids as defined in claim 22 wherein said frangible member is initially formed as a separate component from said body section.

24. A compartmented flexible I.V. container for at least two different and incompatible I.V. fluids as defined in claim 22 further including a tubular port member in fluid tight communication with each said compartment.

25. A compartmented flexible I.V. container for at least two different and incompatible I.V. fluids as defined in claim 22 wherein said frangible member is composed of a polyolefin resinous plastic material.

* * * * *